UNITED STATES PATENT OFFICE.

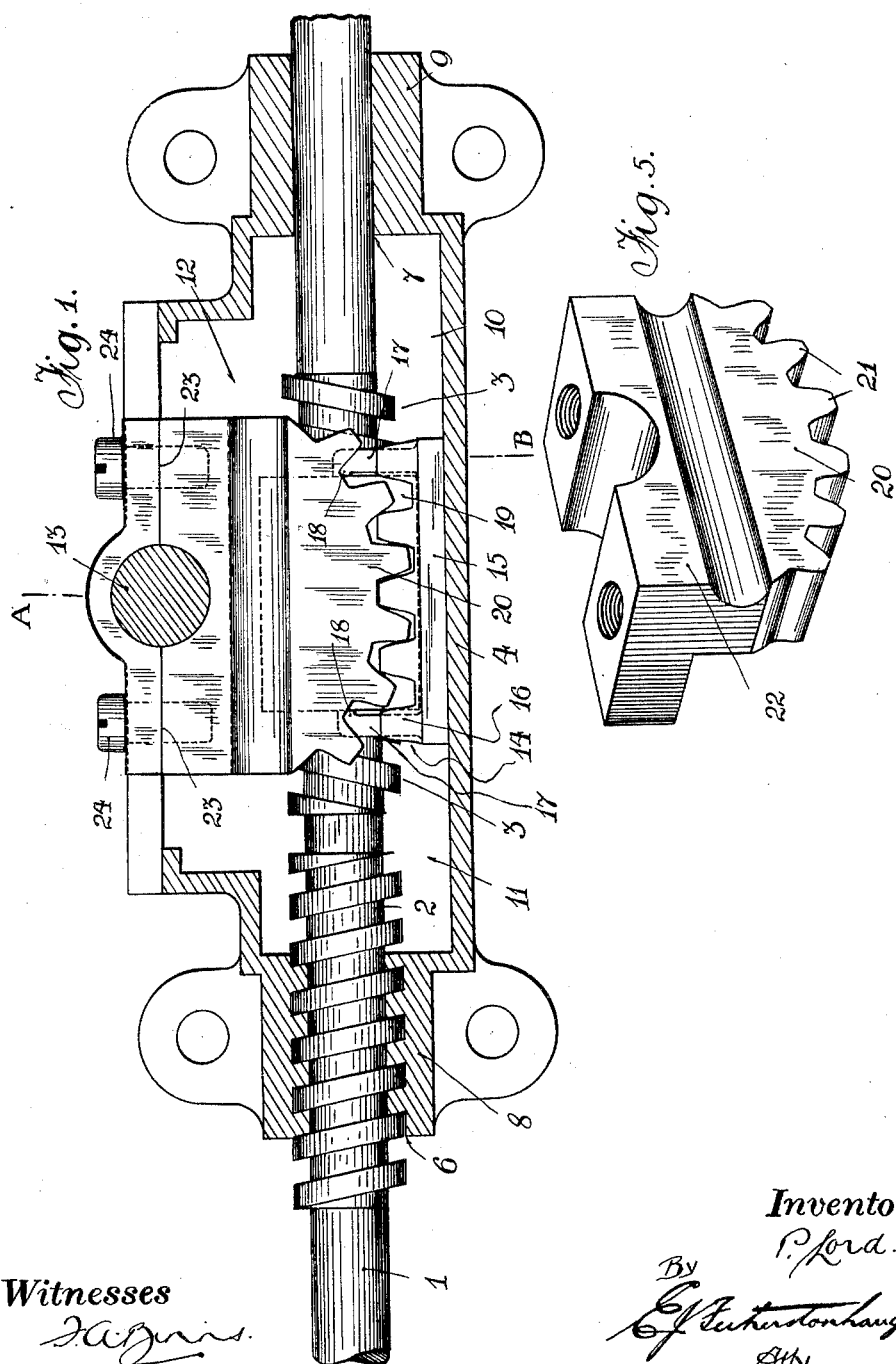

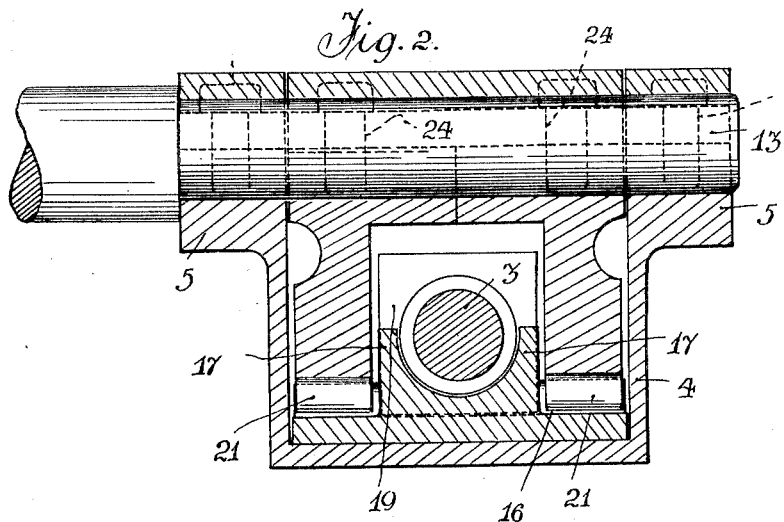
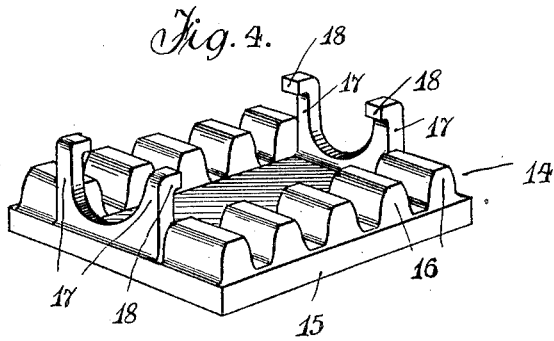
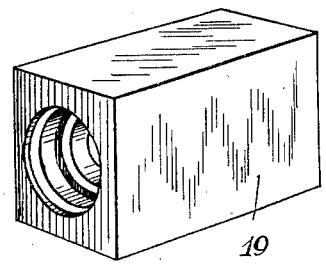

PETER LORD, OF MONTREAL, QUEBEC, CANADA, ASSIGNOR OF ONE-FOURTH TO JOSEPH ANTOINE HEBERT, ONE-EIGHTH TO CHARLES LELUAU, ONE-EIGHTH TO LOUIS ADHEMAR DELORME, AND ONE-EIGHTH TO GUSTAVE ITZWEIRE, ALL OF MONTREAL, CANADA.

GEARING.

1,009,910.  Specification of Letters Patent.  Patented Nov. 28, 1911.

Application filed March 1, 1911. Serial No. 611,653.

*To all whom it may concern:*

Be it known that I, PETER LORD, resident of 140 Berri street, in the city and district of Montreal, in the Province of Quebec, in the Dominion of Canada, a subject of the King of Great Britain, have invented certain new and useful Improvements in Gearing; and I do hereby declare that the following is a full, clear, and exact description of the same.

The invention relates to improvements in gearing, as described in the present specification and illustrated in the accompanying drawings that form part of the same.

The invention consists essentially in the novel arrangement and construction of parts, whereby the actuating member is made to travel at twice the speed of the operating member and is effectually locked in any one position.

The objects of the invention are to devise a form of gearing for various purposes that will turn a shaft very rapidly with a minimum movement to the operating part, to eliminate the accidental swerving of the members turned in steering vehicles or boats, and generally to provide a compact, cheap, serviceable and durable mechanism for steering boats and vehicles and rotating shafts requiring only a limited movement to perform their function.

In the drawings, Figure 1 is a longitudinal sectional view of the device. Fig. 2 is a cross sectional view on the line A—B in Fig. 1. Fig. 3 is a perspective detail of the actuating nut. Fig. 4 is a perspective detail of the rack member of the shaft turning gear mechanism. Fig. 5 is a perspective detail of the segmental gear coacting with said rack and adapted to be fixedly mounted on the shaft.

Like numerals of reference indicate corresponding parts in each figure.

Referring to the drawings, 1 is the operating shaft having the adjacent screw threads 2 and 3, the thread 2 being here shown as a right handed thread and the thread 3 as a left handed thread, that is to say, one thread is right handed and the other is left handed and it is of no material difference which is the right and which is the left, so long as they are opposite in direction.

4 is a casing split into two parts and joined by suitable bolts through the lugs 5, said casing at one end having the screw hole 6 correspondingly threaded to the thread 2 and in which the said threaded portion 2 of the shaft turns and at the other end in alinement with said screw hole 6, the journal orifice 7, in which the plain portion of the shaft 1, beyond the thread 3, turns, the ends 8 and 9 of said casing, in which said screw hole and said journal orifice are located, being separated by the body 10 of said casing containing the rack space 11 on one side of the shaft and the space 12 on the other side of the shaft, through which the shaft or post 13 extends at right angles to the shaft 1 and opposite the thread 3.

14 is a rack having the back 15 sliding on the inner wall of the casing 4 in the rack space 11 and the teeth 16 projecting from said back in parallel rows on each side of said shaft.

17 are fingers projecting from the back 15 and having the inwardly turned tips 18.

19 is a nut, correspondingly threaded and mounted on the thread 3 and engaged intermediately by the finger tips 18. Consequently any movement of said nut, caused by the turning of the operating shaft 1, will be communicated to the rack 14, causing said rack to slide in said rack space in the casing.

20 is a bifurcated segmental gear having the parallel rows of teeth 21 coacting with the teeth 16 of said rack 14 and the body portion 22 split at 23 toward the outer end thereof and encircling the shaft 13 centrally in relation to said split portion and fixedly secured to said shaft by the cap screws 24.

It will thus be seen that the actuating member is the nut 19, while the operating member is the shaft 1, this distinction being made for more clearly describing the invention, as by attaching the shaft 1 to any suitable handle or turning arrangement, the initial operation is accomplished and this initial operation is the movement, either outwardly, from or inwardly into the casing 4, of the shaft 1 from the screw end and in making the turn, whereby the screw end of the shaft enters farther into the casing, the opposite screw 3, which is entirely within the casing turns within the nut 19, which is held from rotation by the segmental gear 20 and the rack 14. Therefore, the nut travels along the shaft in the same direction as the initial movement of said shaft and as the said nut is moving in a contrary direction to the thread on which it is mounted, the speed at which the said nut travels is just double the speed of the said initial movement of the shaft. Thereby the actuating member, that is to say, the nut, moves the rack 14 and thus brings into operation the gear mechanism for rotating the shaft 13, which may be a rudder post, a shaft in a motor vehicle or any other shaft requiring limited reciprocal movements.

What I claim as my invention is:

1. In gearing, a casing substantially rectangular in cross section, a sliding member fitting the width of said casing and having a pair of racks formed thereon and fingers projecting upwardly therefrom, a nut held from longitudinal movement by said fingers between said pair of racks and internally threaded, a rotatable operating shaft extending longitudinally through said casing and having an external thread engaging said nut thread, a driven shaft journaled transversely in said casing, and a bifurcated gear bridging over said nut and engaging said pair of racks and rigidly mounted on said driven shaft.

2. In gearing, a casing substantially square in cross section and having a screw threaded orifice through one end thereof and a plain shaft orifice through the other end in alinement with the aforesaid orifice, a sliding member fitting the width of said casing and having a plurality of fingers projecting therefrom, a nut non-rotatably held by said fingers in engagement with said sliding member and internally threaded oppositely to the casing thread aforesaid, an operating shaft extending into said casing through said shaft orifice and threaded to fit said casing thread and said nut thread, a driven shaft journaled in said casing, and means carried by said sliding member for turning said driven shaft.

3. In gearing, an actuating member, an operating member coincidently moving said actuating member at double the speed of its own movement, a rack gripping said actuating member, a gear reaching over said operating member and coacting with said rack, and a shaft having said gear fixedly mounted thereon.

Signed at the city and district of Montreal, Quebec, Canada, this twenty-fifth day of February, 1911.

PETER LORD.

Witnesses:
P. SHEE,
F. A. BINNS.